United States Patent [19]

Rowland

[11] Patent Number: 5,584,698
[45] Date of Patent: Dec. 17, 1996

[54] METHOD AND APPARATUS FOR IMPROVING THE READING EFFICIENCY OF A DYSLEXIC

[76] Inventor: Linda C. Rowland, 1410 Saddleback La., Lewisville, Tex. 75067

[21] Appl. No.: 441,340

[22] Filed: May 15, 1995

[51] Int. Cl.⁶ .................................................. G09B 17/02
[52] U.S. Cl. ......................................... 434/184; 434/170
[58] Field of Search .................................. 434/184, 170, 434/178, 179

[56] References Cited

U.S. PATENT DOCUMENTS

| | | | |
|---|---|---|---|
| 2,848,823 | 8/1958 | Washburn | 434/170 |
| 3,235,976 | 2/1966 | Elliott et al. | 434/170 |
| 3,482,333 | 12/1969 | Tragar, Jr. | 434/170 |
| 3,715,812 | 2/1973 | Novak | 434/170 |
| 3,813,471 | 5/1974 | Dean, III | 434/170 |
| 3,823,492 | 7/1974 | Allain | 434/170 |
| 4,270,284 | 6/1981 | Skellings | 434/170 |
| 4,379,699 | 4/1983 | Nelson | 434/184 |
| 4,643,679 | 2/1987 | Tatum | 434/170 |
| 4,770,635 | 9/1988 | Gabay | 434/184 |
| 5,114,346 | 5/1992 | Fioramonti | 434/184 |

*Primary Examiner*—Paul J. Hirsch
*Attorney, Agent, or Firm*—Brinks Hofer Gilson & Lione

[57] ABSTRACT

A teaching aid for increasing the reading efficiency of a dyslexic. The teaching aid comprises a transparent sheet of material having a plurality of horizontal color gradient that is placed over an area of text to be read. Preferably, each color gradient covers a single line of text. When the color gradient covers the text area, a less distracting environment is created and allows the dyslexic reader to more readily focus and concentrate on the lines of text.

15 Claims, 2 Drawing Sheets

METHOD AND APPARATUS FOR IMPROVING THE READING EFFICIENCY OF A DYSLEXIC

BACKGROUND OF THE INVENTION

Dyslexia is defined as the severely impaired ability to read, presumed to be caused by a central nervous system dysfunction. The National Joint Committee on Learning Disabilities (1988) refers to a central nervous system dysfunction as some brain or neurological damage that impedes motor and/or learning abilities. Although dyslexia is addressed as a disability in numerous special education textbooks, little emphasis is placed on the fact that most people suffering from dyslexia eventually compensate and learn to read well. The existence of dyslexic doctors, lawyers, politicians and scientists confirm the possibility of success.

However, today's world demands more of our children and educators. Children need to read more quantity at a higher level than compared to the past. Consequently, the compensation or adaptation skills are lacking, as the child has yet to have had the time to build these skills. Thus, it is desirable to provide the tools necessary to allow the dyslexic child to adapt and compensate so that they may reach their potential and independence with fewer modifications.

SUMMARY OF THE INVENTION

To solve the foregoing problems, the invention is directed to a method and apparatus for improving the reading efficiency of a dyslexic. In the preferred embodiment of the invention, a transparent sheet of material covers an area of text to be read. The transparent sheet of material has a plurality of horizontally graduated colors disposed thereon. Each horizontally graduated color covers at least a portion of one line of text and allows the attention of the dyslexic to be directed to the at least one line of text.

These and other aspects and advantages of the invention are described or apparent from the following detailed description of the preferred embodiments and appended drawings wherein like reference numbers refer to the same element, feature or component.

BRIEF DESCRIPTION OF THE DRAWINGS

The preferred embodiments are described with reference to the drawings in which.

DETAILED DESCRIPTION OF THE PREFERRED EMBODIMENTS

Figure 1:
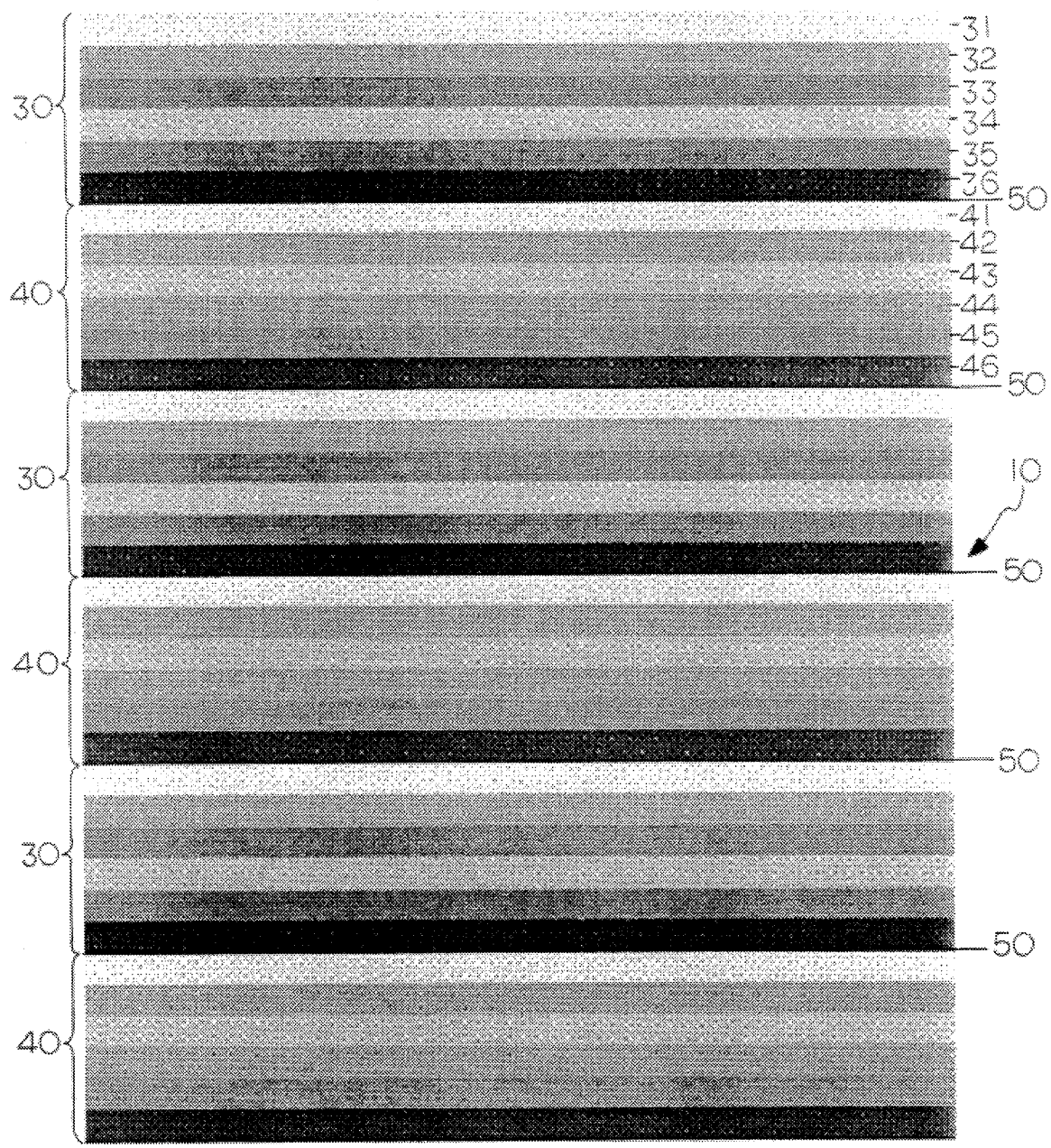
FIG. 1 shows a preferred embodiment of the invention.

FIG. 1 shows a preferred embodiment of the invention. The invention comprises a transparent sheet of material that covers an area of text to be read when placed over the text area.

In the preferred embodiment, the transparent sheet of material 10 includes a plurality of colors that cover at least a portion of the area of text 20 (FIG. 2) to be read. As shown in FIG. 1, for example, the transparent sheet 10 may include a plurality of alternating green and blue colors 30, 40. However, the transparent sheet of material 10 may comprise a plurality of colors in any combination.

Each color of the plurality of colors has a plurality of color gradients or degrees of color intensity forming horizontal lines that cover at least a portion of a line of text to be read. In the preferred embodiment shown in FIG. 1, for example, each alternating green and blue color 30, 40 has six color gradients 31–36, 41–46, respectively. The color gradients for each alternating color progress from a lighter color gradient to a darker color gradient. Alternatively, the color gradients may also progress from a darker color gradient to a lighter color gradient. The color gradients 31–36, 41–46 allow for the dyslexic to more easily transition from the end of a line to the beginning of the next line. Each color may be separated by a solid black line 50 to better separate the alternating green and blue colors 30, 40.

It should be understood that the invention is not limited by the number of colors, the number of color gradients and the arrangement and combination of colors and that other colors, color gradients and other arrangements of colors are within the scope of the invention. For example, other combinations of colors may be more soothing to a reader, even though that reader may or may not be dyslexic.

Figure 2:
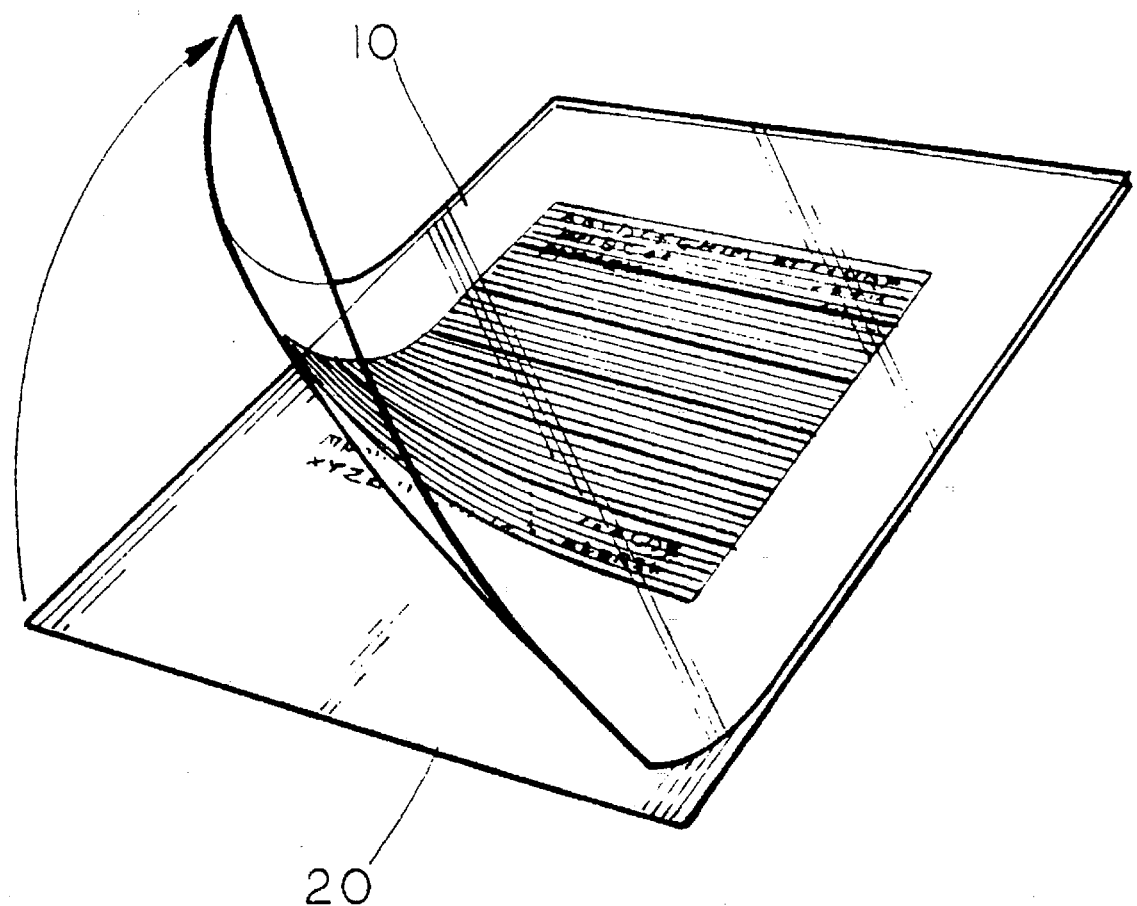
FIG. 2 shows a preferred embodiment of a method of using the invention of FIG. 1.

FIG. 2 shows the sheet of material 10 when placed over the area of text 20 to be read. For best results, the sheet of transparent material 10 should border the area of text 20 to be read and each line of text should be covered by only one color gradient.

In addition, the color gradients or color intensities should cover only the area of text to be read. When the color gradients cover only the text area, the invention allows the attention of the reader to be directed only to the area of text to be read and produces a less distracting environment for the reader.

As described above, the invention allows a dyslexic to focus and concentrate on lines of text and more easily transition from the end of a line to the beginning of the next line. As a result, the dyslexic has the ability to focus on lines of text without losing place.

While this invention has been described in conjunction with specific embodiments, it is evident that many alternatives, modifications and variations will be apparent to those skilled in the art. Accordingly, the preferred embodiments of the invention as set forth herein are intended to be illustrative, rather than limiting. Various changes may be made without departing from the spirit and scope of the invention as defined in the following claims.

I claim:

1. A teaching aid for a dyslexic, comprising:

a transparent sheet of material; and colors forming horizontal lines on the transparent sheet that cover at least a portion of an area of text to be read, each color comprises a plurality of color gradients, each color gradient covering at least a portion of one line of text, wherein each color gradient creates a less distracting environment and allows the dyslexic to more readily focus and concentrate on the lines of text to be read.

2. The teaching aid according to claim 1, wherein said colors comprise green and blue.

3. The teaching aid according to claim 1, wherein said plurality of color gradients comprises six color gradients.

4. The teaching aid according to claim 1, wherein said plurality of color gradients for each color progresses from a lighter color gradient to a darker color gradient.

5. The teaching aid according to claim 1, wherein said plurality of color gradients for each color progresses from a darker color gradient to a lighter color gradient.

6. An aid for increasing the reading efficiency of a dyslexic, comprising:

a transparent sheet of material having a plurality of colors that cover at least a portion of an area of text to be read; and a plurality of horizontally positioned color gradients for each color, each color gradient covering at least a portion of one line of text, whereby each color gradient creates a less distracting environment and allows the dyslexic to more readily focus and concentrate on the lines of text to be read.

7. The aid according to claim 6, wherein said plurality of colors comprises green and blue colors.

8. The aid according to claim 6, wherein said plurality of color gradients comprises six color gradients.

9. The aid according to claim 6, wherein said color gradients for each color progresses from a lighter color grade to a darker color grade for each color.

10. The aid according to claim 6, wherein said color gradients for each color progresses from a darker color grade to a lighter color grade for each color.

11. A method of increasing the reading efficiency of a dyslexic, comprising the step of:

placing a transparent sheet of material over at least a portion of an area of text to be read, said transparent sheet of material having a plurality of colors, each color comprising a plurality of color gradients forming horizontal lines, each color gradient covering at least a portion of one line of text, whereby each color gradient creates a less distracting environment and allows the dyslexic to more readily focus and concentrate on the lines of text to be read.

12. The method according to claim 11, wherein said plurality of colors comprises green and blue.

13. The method according to claim 11, wherein said plurality of color gradients comprises six color gradients.

14. The method according to claim 11, wherein said plurality of color gradients for each color progresses from a lighter color gradient to a darker color gradient when said transparent sheet of material is placed over the area of text to be read.

15. The teaching aid according to claim 11, wherein said plurality of color gradients for each color progresses from a darker color gradient to a lighter color gradient when said transparent sheet of material is placed over the area of text to be read.

* * * * *